United States Patent Office 3,493,826
Patented Feb. 3, 1970

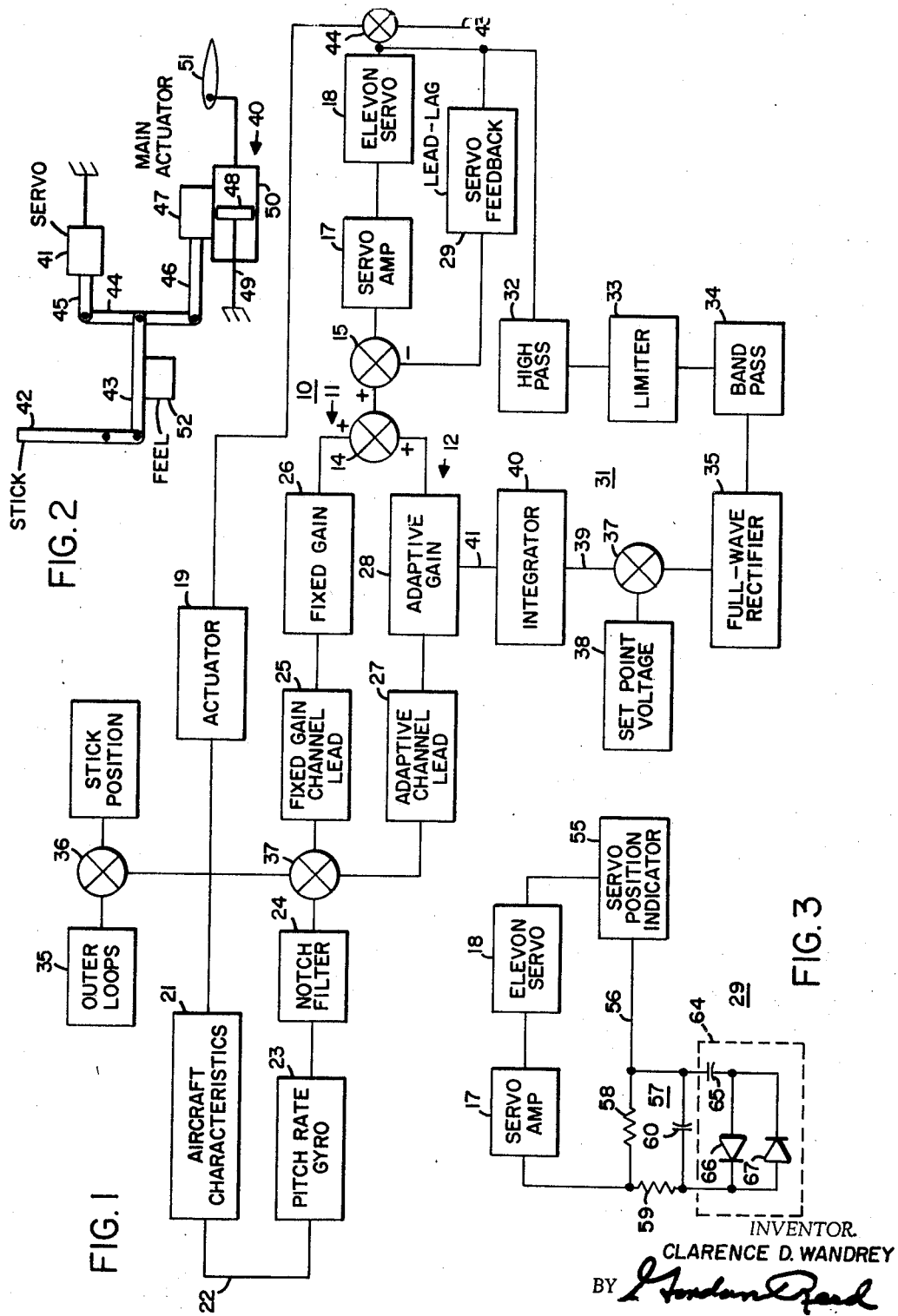

3,493,826
SERVOMECHANISM INCLUDING A LEAD NETWORK FEEDBACK AND MEANS TO MODIFY THE LEAD NETWORK RESPONSIVE TO RATE
Clarence D. Wandrey, Fridley, Minn., assignor to Honeywell Inc., Minneapolis, Minn., a corporation of Delaware
Filed Sept. 13, 1965, Ser. No. 486,823
Int. Cl. B64c 13/46; H02p 7/00
U.S. Cl. 318—18                    2 Claims

ABSTRACT OF THE DISCLOSURE

An adaptive-closed loop control system which adjusts its gain in accordance with the amplitude of the limit cycle of its servomotor that operates means to control a condition, modifies the lag of the feedback signal of the closed loop servosystem when the servomotor limit cycle amplitude reaches a predetermined magnitude, to reduce high amplitude-low frequency oscillations of the system.

---

This invention relates to improvement in control apparatus for controlling a condition and particularly relates to control apparatus for controlling a flight condition of an aircraft. The invention herein described was made in the course of or under a contract or subcontract thereunder, with the United States Air Force. The invention pertains to improvements in control apparatus of the adaptive type illustrated for example by the U.S. Patent No. 3,057,584 to R. B. Bretoi dated Oct. 9, 1962. Such adaptive control apparatus may be used in high performance aircraft attaining wide ranges of air speed and altitude. Such aircraft may be of the type having elevon control surfaces which function both as elevators to control pitch of the craft and as ailerons to control roll of the aircraft.

Automatic pilots of the self-adaptive type as in Bretoi and also as illustrated by the automatic pilot disclosed in U.S. Patent 3,283,229 to John H. Lindahl may include a feedback arrangement from the servomotor into the servocontrol amplified. These feedback arrangements may assume various forms depending upon the aircraft and its flight regime. A lead network or frequency sensitive network having parallel branches each branch including impedance with one branch additionally including capacitance in electrical series with the impedance therein, hereinafter termed a phase shifting network may be provided in the feedback path or servo inner loop to provide the high-low frequency gains necessary for good outer-loop-mode transient response of the adaptive control system. Such phase shifting or lead network provides excellent performance throughout the original design parameter ranges, that is normal servo rates, but the network becomes a disadvantage when these ranges are exceeded. These ranges may be exceeded by rapid pitch-up maneuvers, if the adaptive system is being used in the pitch axis control. Large-rapid pitch-up maneuvers when sudden large inputs are applied may result in "saturation" of the servomotors and other elements in the adaptive control system.

Such saturation results in high-amplitude low-frequency oscillations. Thus, they are caused from a complex combination of differences in system actuator and servo rate limits, back lash, and system phase lags. As stated, certain phase lags are provided in the feedback of the servo loop for better performance.

An object, therefore, of this invention is to improve the performance of an adaptive control system for aircraft when the aircraft is subject to rapid-extensive pitch-up changes.

A further object of this invention is to automatically reduce the lags in a feedback arrangement for a closed loop servo.

A further object of this invention is to provide an improved adaptive control system having a gain controller responsive to the adaptive control system servo limit cycling or oscillations and which system reduces the lead in the servo feedback loop when the servo oscillations exceed the normal limit cycle magnitude.

It is a further object of this invention to provide an improvement in an automatic pilot having a servo motor which includes a lead feedback arrangement comprising means for varying the lead characteristics of the arrangement in accordance with the servomotor oscillations.

Further objects and advantages of the invention will be realized upon consideration of the accompanying description had in conjunction with the subjoined drawings.

In the drawings:

FIGURE 1 is a block diagram of a combined linear and self adaptive control system for controlling an aircraft about its pitch axis;

FIGURE 2 shows the servomotor operated by the control apparatus in its relation to a manually operable controller and the aircraft's main actuator;

FIGURE 3 shows the improved feedback arrangement, provided in the feedback path of the servomotor, operated by the control apparatus.

Apparatus for positioning a control surface of an aircraft such as its elevator or elevon includes a main actuator, in many cases. Such main actuator includes a control valve that may be directly manually positioned from the pilot stick and may also be positioned by a series servomotor in turn controlled from automatic control apparatus. The manual controller and servomotor are so related that operation of the series servomotor is not reflected back, normally, upon the stick.

For improved performance, the servomotor may be of the fluid type and may be controlled from a servoamplifier in turn receiving electrical control signals. For improved system performance such servomotor may have in its feedback loop a lead or phase shifting network for providing desired high-low frequency gains for good outer loop mode transient response of the aircraft. Such outer loop may include angle of attack sensors or aircraft attitude sensors.

Upon large-rapid changes in the position of the control stick of such magnitude and suddenness exceeding the capability of the main actuator and other elements to follow the same, the main actuator may be "saturated" or unable to keep up with the stick movements. This saturated condition results in nonlinear effects. Such non-linear effects and servo lags cause low frequency-large amplitude oscillations of the aircraft.

To offset the non-linear effects which with the phase lags in the servo tend to cause these oscillations of the aircraft, the lead or phase shifting network in the servo feedback loop is automatically modified when the servo oscillations exceed the normal limit cycle amplitudes to thus vary the feedback network and reduce the phase lead thereof thereby reducing the above oscillations of the aircraft.

Referring to FIGURE 1, the automatic pilot or automatic control apparatus 10 for the aircraft has been applied to control the craft about its pitch axis but it will be realized that such control may be also applied either to the aircraft yaw axis or to its roll axis. Control apparatus 10 includes a linear section 11 and a self adaptive section 12. The outputs of these two channels are combined in a network or summing device 14 which in turn has its output supplied to a second summing network or summing device 15 which in turn controls a servoamplifier 17. The servoamplifier 17 controls an elevon series servomotor 18. The operation of the servomotor 18 is applied to a differential device 44 for controlling a main actuator as will be subsequently described. The operation of the servomotor 18 is also supplied to a servo feedback arrangement 29 which includes a lead or frequency sensitive phase shifting circuit. The output from the servo feedback arrangement 29 is supplied to the summing device 15 to close the servo loop.

A signal in accordance with displacement of servo 18 from a normal position is also supplied to a high pass filter 32 of an adaptive gain controller 31 in the adaptive system 12. The output from the filter 32 is supplied to a limiter 33 and then to a band pass filter 34 that transmits residual servo oscillations or limit cycle oscillations having in turn its output supplied to a full wave rectifier 35. The output from rectifier 35 is supplied to a network or summing device 37 having a second input thereto provided from a set point voltage source 38. The difference between the two inputs to summing device 37 is supplied by conductor 39 to an integrator 40 having in turn its output supplied through conductor 41 to change the gain in adaptive gain device 28. An adaptive system having this form of gain control arrangement is old in the above patent to Bretoi and is thus not new herein.

For aircraft control purposes, the output of the summing device 44 is applied to a main actuator 19 of the aircraft which positions the control surface of the aircraft. In response to the control surface displacement, the aircraft 21 changes its pitch attitude which is supplied, in the case of pitch rate, through flow device 22 to a pitch rate gyro 23 that provides a signal which may be electrical in character and it is supplied through a notch filter 24 to summing network or summing device 37. The output from summing device 37 is supplied both to the linear channel 11 and adaptive channel 12.

The summing network 37 may also receive other electrical signals from a signal summing network 36 receiving outer loop control signals from sensing devices 35 and stick position signals from a signal generator operated by the aircraft control stick.

In the gain controller 31, the high pass and band pass networks 32 and 34 are designed to attenuate all frequencies not in the vicinity of the system limit cycle frequency. When the adaptive system is operating properly, the servomotor has a limit cycle frequency as more fully described in the above Bretoi patent.

In FIGURE 2, a schematic arrangement is provided for the main pitch control surface actuator 41 which may be a fluid type servomotor. FIGURE 2 includes the series servomotor often times termed differential servomotor and a control stick 42 of the aircraft. The control stick 42 is pivoted to the main frame of the aircraft and its lower end has extending therefrom a link 43 which connects to the midpoint, roughly, of a differential lever 44. One end of differential lever 44 is connected to the output member 46 for the control valve 47 of the main actuator. The main actuator includes a piston 48 having its piston rod 49 anchored to the aircraft, with the result that when the control valve 47 is displaced from a normal position to port fluid to one side or the other of piston 48, since the piston 48 is anchored to the craft, the remaining portion of the servomotor such as the cylinder 50 moves to position pitch control surface 51 and at the same time effect a follow-up action on valve 47 to place it in normal position relative to the cylinder 50 of the main actuator 40. The link 43 is provided with a conventional "feel" system for the control stick 42 so that the automatic pilot 10 may control the series servo 41, normally, without a resultant movement of the control stick 42. While the control stick 42 may directly move the summing lever 44 to control operation of the main actuator 40, movement of the control stick 42 may also operate a separate electrical stick position signal generator FIGURE 1 for supplying a signal to a summing network 36.

While it was stated that the stick feel system 52 with no pressure applied to the stick 42 by the pilot, normally maintains the stick 42 against displacement despite operation of the series servomotor 41, it will be evident that if the operation rate of series servo 41 is greater than the operation rate of the main actuator 40, so that the rate of movement of the valve 47 by servo 41 is greater than the follow-up action of the main actuator 40, that the control valve 47 will reach the end of its valve cage to "bottom" therein thus holding the member 46 against further movement by servo 41 and causing the rotation of the differential lever 44, about its lowest pivot connection, to be applied to the control stick 42. This action is termed "stick motion feedback." In other words, the "stick motion feedback" is the result of the difference between the series servo actuator rate and the main actuator rate. The main actuator at this time has nonlinear operation. These two effects and system phase lags result in low frequency-large amplitude oscillations.

FIGURE 3 shows an electrical schematic of the frequency sensitive phase shifting feedback arrangement 29 associated with the series servoamplifier 17 and the series servomotor 18, also termed the elevon servo. The feedback arrangement 29 receives a servo position signal from a pickoff 55 which responds to or is operated from servo 18. Pickoff 55 provides a DC signal in accordance with the displacement of the servo 18 from a normal position. The feedback arrangement 29 includes a lead network 57 comprising a high resistor 58 and in parallel therewith but in series relation a small resistor 59 and a small capacitor 60. The output of the pickoff 55 is supplied through conductor 56 to the lead or phase shifting network 57 having its output connected to servoamplifier 17.

The invention herein is primarily concerned with the frequency feedback arrangement 29. In order to reduce the phase lag in a critical frequency range as between 0.5–2.0 cycles per second, a shunting or parallel path arrangement 64 is provided for the capacitor 60. This shunting arrangement comprises a capacitor 65 roughly ten times the capacitance of capacitor 60 and a pair of diodes 66, 67 having roughly a 0.5 volt threshold. The diodes 66 and 67 are connected in parallel for bipolarity conduction and are in series with the capacitor 65. One terminal of capacitor 65 is connected to one side of capacitor 60 and one side of the parallel connected diodes 66, 67 is connected to the opposite side of capacitor 65 and the remaining side of the diode arrangement is connected to the opposite side of capacitor 60.

SUMMARY

In the control system 10 comprising the linear channel 11 and the adapter channel 12, for best or more accurate control from the outer loop sensors 35 such as an angle of attack sensor or a pitch-attitude sensor, a high-low frequency inner loop gain is required. This high inner loop gain at low frequency is provided by the feedback arrangement 29 and particularly by the lead arrangement 57 in FIGURE 3. However, while this network 57 provides the desired shaping to obtain the most accurate control from the outer loop sensors, it does result in low frequency phase lags in the inner loop system. In other words, this lag which is mechanized by the lead network 57 in the servo feedback arrangement 29, provides excellent performance throughout the original design parameter ranges (as servo rates) and becomes a disadvantage only when these parameter ranges are exceeded.

These servo rates are exceeded when sudden large inputs are applied by movement of the control stick 42 by the pilot. These sudden movements result in movement of the control valve 47 at rapid rate. This movement is not balanced or neutralized by the follow-up action in the main actuator 40, resulting in "saturation" of the main actuator 40. Since the main actuator 40 does not operate at the rate called for by movement of the stick 42, a non-linearity results in the system. While this is one type of non-linearity, there may also be others that occur simultaneously. An instability occurs which can result in low frequency high amplitude oscillations about the pitch axis. This stability phenomenon is a result at least in part of the relatively large amount of phase lead present in the feedback path in the adaptive controller in the frequency range between 0.5 and 2.0 c.p.s., on or close to maximum adaptive gain.

To change the lead characteristics of network 57 to reduce the phase lag, capacitor 65 is placed in parallel with capacitor 60. However, such change in the lead circuit 57 affects the limit cycle amplitude and frequency. This change adversely affects the gain changer operation at certain frequencies such as 0.5 through 2.0 cycles per second. To modify this effect, the diodes 66 and 67 are provided so that the capacitor 65 is not effective until the threshold equal to the normal limit cycle voltage amplitude such as 0.5 volt of the diodes is exceeded.

Thus, the modification in the feedback arrangement 29 by the inclusion of the arrangement 64 leaves the system unchanged for small amplitude disturbances, such as the limit cycle amplitude, but for larger amplitudes and thus larger signal voltages from the servo position pickoff 55 reduces the phase lag in the critical frequency range or as stated when the system amplitudes reach larger levels. Consequently, when system non-linearities occur such as saturation of the main actuator, causing non-linearities that result in low frequency large amplitude oscillations of the aircraft, the capacitor 65 is effective to reduce the lag in the inner loop feedback 57 to reduce such oscillations.

It will now be apparent that I have provided an improvement in an automatic pilot for an aircraft having a servomotor controlled by an inner loop that includes a lead or phase shifting feedback arrangement, by providing means for varying the lead or phase shifting characteristics in accordance with servomotor limit cycle amplitude oscillations.

What is claimed is:

1. In an automatic pilot apparatus having a series servomotor operating normally independent of manual controls and controlling a main elevator surface actuator of the follow-up type, said automatic pilot having an outer loop sensor sensing a flight condition of the craft following operation of said manual controls and consequent operation of the main elevator actuator, a feedback arrangement of the lead type comprising a high impedance and two capacitors forming three parallel paths, one normally open operated by the series servomotor, and further means for varying the lead characteristics of the feedback arrangement by effecting a circuit through said one path also in response to oscillations of said series motor resulting from large-rapid displacements of the manual control, wherein the automatic pilot is of the self-adaptive type including means responsive to limit cycle oscillations of the series servomotor for varying the gain thereof said limit cycle amplitude normally not exceeding a given magnitude, and with said further means responsive to large oscillations of the series servomotor exceeding the given magnitude of limit cycle amplitude, varying the lead arrangement characteristics to decrease the phase lead thereof.

2. The apparatus of claim 1, wherein the larger oscillations normally have a frequency lower than the normal limit cycle frequency.

References Cited

UNITED STATES PATENTS

| | | |
|---|---|---|
| Re. 25,491 | 12/1963 | Lee et al. |
| 2,668,264 | 2/1954 | Williams. |
| 2,995,694 | 7/1961 | Sorkin et al. |
| 3,057,584 | 10/1962 | Bretoi. |
| 3,219,936 | 11/1965 | Eksten et al. |

OTHER REFERENCES

Chestnut and Mayer: "Servomechanisms and Regulating System Design," vol. 1, pp. 81, 112, and 177–179, John Wiley & Sons, New York, 1951.

THOMAS E. LYNCH, Primary Examiner

U.S. Cl. X.R.

244—77; 318—489